US009330514B2

(12) United States Patent
Kuenzi et al.

(10) Patent No.: US 9,330,514 B2
(45) Date of Patent: May 3, 2016

(54) SYSTEMS AND METHODS FOR LOCKING DEVICE MANAGEMENT

(71) Applicant: UTC FIRE & SECURITY CORPORATION, Farmington, CT (US)

(72) Inventors: Adam Kuenzi, Silverton, OR (US); Jonah J Harkema, Newberg, OR (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 181 days.

(21) Appl. No.: 13/941,391

(22) Filed: Jul. 12, 2013

(65) Prior Publication Data

US 2014/0028438 A1    Jan. 30, 2014

Related U.S. Application Data

(60) Provisional application No. 61/675,592, filed on Jul. 25, 2012.

(51) Int. Cl.
G07C 9/00 (2006.01)

(52) U.S. Cl.
CPC ........ *G07C 9/00817* (2013.01); *G07C 9/00571* (2013.01); *G07C 9/00904* (2013.01); *G07C 2009/00841* (2013.01)

(58) Field of Classification Search
CPC ........... G07C 9/00111; G07C 9/00309; G07C 9/00007; G07C 2009/00769; G07C 9/00103
USPC ................ 340/5.1–5.86, 10.1–10.6
See application file for complete search history.

(56) References Cited

U.S. PATENT DOCUMENTS

| 4,926,665 | A | 5/1990 | Stapley et al. |
| 5,815,084 | A | 9/1998 | Lavelle et al. |
| 6,331,812 | B1 | 12/2001 | Dawalibi |
| 6,525,644 | B1 | 2/2003 | Stillwagon |
| 7,051,367 | B1 | 5/2006 | Krishnaswamy et al. |
| 7,343,014 | B2 | 3/2008 | Sovio et al. |
| 7,464,858 | B2 | 12/2008 | Crawford |
| 7,475,812 | B1 | 1/2009 | Novozhenets et al. |
| 7,606,558 | B2 | 10/2009 | Despain et al. |
| 8,045,960 | B2 | 10/2011 | Orakkan |
| 8,079,240 | B2 | 12/2011 | Brown et al. |
| 8,120,460 | B1 | 2/2012 | Zhu |
| 8,135,951 | B2 | 3/2012 | Adams et al. |
| 8,150,374 | B2 | 4/2012 | Lowe |
| 2008/0150684 | A1 | 6/2008 | Gartner |
| 2008/0246587 | A1 | 10/2008 | Fisher |

(Continued)

FOREIGN PATENT DOCUMENTS

| DE | 4234321 A1 | 4/1994 |
| EP | 2085934 A1 | 8/2009 |

(Continued)

*Primary Examiner* — George Bugg
*Assistant Examiner* — Sharmin Akhter
(74) *Attorney, Agent, or Firm* — Cantor Colburn LLP

(57) ABSTRACT

A system for locking device management is disclosed. A server can transmit locking device programming instructions for a locking device to a mobile device based on a locking device programming trigger. The mobile device can search for the locking device and transmit the programming instructions to the locking device via wireless signals. The locking device can communicate with the mobile device via wireless signals and execute the programming instructions.

7 Claims, 4 Drawing Sheets

(56) References Cited

U.S. PATENT DOCUMENTS

| | | | |
|---|---|---|---|
| 2010/0141381 A1* | 6/2010 | Bliding et al. | G07C 9/00309 340/5.61 |
| 2010/0306549 A1 | 12/2010 | Ullmann | |
| 2011/0042971 A1 | 2/2011 | Youssef et al. | |
| 2011/0165836 A1 | 7/2011 | Dixon et al. | |
| 2011/0187493 A1 | 8/2011 | Elfstrom et al. | |
| 2011/0312273 A1 | 12/2011 | Harris | |
| 2012/0011367 A1 | 1/2012 | Denison | |
| 2012/0119877 A1 | 5/2012 | Ng et al. | |
| 2012/0129451 A1* | 5/2012 | Metivier | H04B 5/0025 455/41.1 |
| 2012/0157079 A1* | 6/2012 | Metivier | G07C 9/00182 455/420 |
| 2012/0157080 A1* | 6/2012 | Metivier | G07C 9/00309 455/420 |
| 2012/0213362 A1* | 8/2012 | Bliding et al. | G07C 9/00309 380/44 |
| 2012/0280783 A1* | 11/2012 | Gerhardt et al. | G07C 9/00309 340/5.6 |
| 2013/0212661 A1* | 8/2013 | Neafsey et al. | 726/6 |

FOREIGN PATENT DOCUMENTS

| | | |
|---|---|---|
| GB | 2402840 A | 12/2004 |
| WO | 2011033199 A1 | 3/2011 |
| WO | 20110304482 A1 | 3/2011 |
| WO | 2011149424 A1 | 12/2011 |

\* cited by examiner

SYSTEMS AND METHODS FOR LOCKING DEVICE MANAGEMENT

This application claims the benefit of Provisional U.S. Patent Application No. 61/675,592, filed Jul. 25, 2012, which is incorporated herein by reference in its entirety.

FIELD

Systems and methods for locking device programming and management.

DESCRIPTION OF THE PRIOR ART

Electronic locks can be utilized in commercial or residential buildings to effectively control access to rooms or buildings. One advantage of an electronic lock, hereinafter a "locking device," is that a locking device can be reprogrammed to allow access to different keys without being physically re-keyed.

Conventional, "off-line" locking devices are locking devices that are not connected to a communication network, unlike an "on-line" locking device. Accordingly, "off-line" locking devices generally require an administrator to intentionally configure locking device changes in a locking device programming and management environment, intentionally assign these programming changes to a proprietary device for programming, and send a technician to manually reprogram the locks using the proprietary device and/or special programming access control cards. Accordingly, reprogramming using such a solution takes significantly more time, requires specialized devices or equipment, and accrues additional costs, as compared to reprogramming "on-line" locking devices.

Therefore, there is a need for a remote lock programming and management system that can allow for the efficient reprogramming of "off-line" locks using nonproprietary devices, triggered and effected by the normal, ordinary operations of an 'access control' system without administrators or technicians being required to perform intentional programming procedures.

SUMMARY

According to embodiments, a locking device programming and management system is disclosed. In certain embodiments, the system includes a server configured to manage one or more locking devices, receive locking device programming triggers, transfer locking device programming instructions to one or more mobile devices, and receive locking device status information from one or more mobile devices.

In additional embodiments, the system includes a mobile device configured to receive locking device programming instructions, search for one or more locking devices via wireless signal, transfer programming instructions to the one or more locking devices via wireless signal, and receive locking device status information from the one or more locking devices via wireless signal.

In further embodiments, the system comprises a locking device configured to receive programming instructions from a mobile device via wireless signal, execute the programming instructions, and transfer locking device status information to the mobile device via wireless signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DESCRIPTION OF THE EMBODIMENTS

With reference now to the various drawing figures in which identical elements are numbered identically throughout, a description of the embodiments will now be provided.

According to aspects of the below disclosure, a mobile device, that may be carried by normal users of an access control system, can be utilized to convey messages and/or programming instructions from a locking device management server to a locking device. Many mobile devices are pre-equipped with wireless transceivers. Accordingly, an "off-line" locking device equipped with a wireless receiver and/or transmitter can communicate with such a mobile device. Therefore, mobile devices can be used to effectively connect "off-line" locking devices to locking device management servers, allowing the "off-line" locking devices to be reprogrammed in a manner similar to "on-line" locking devices. Further, the reprogramming may be effected in such a way that normal users may not be aware that the programming operation is taking place.

Figure 1:
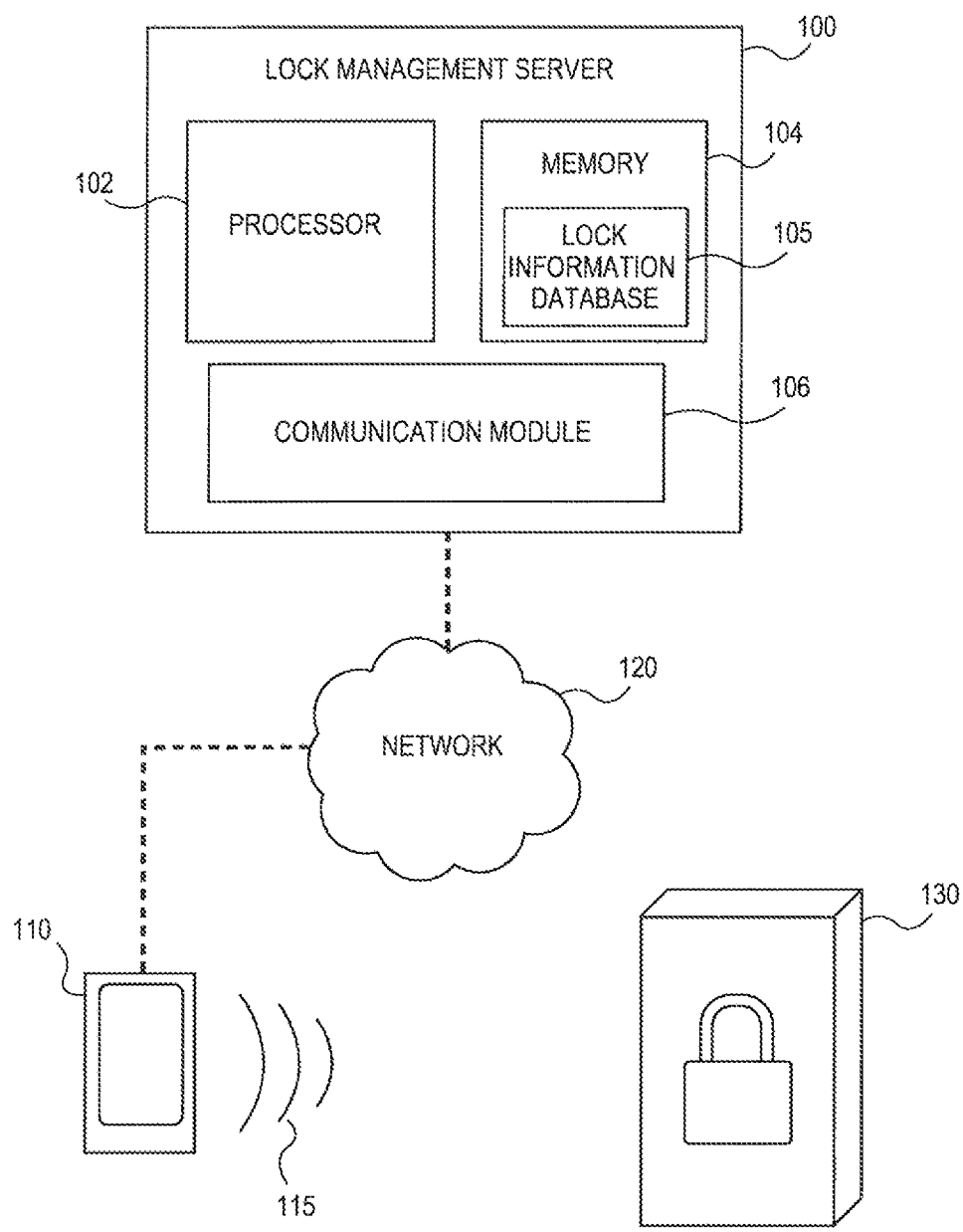
FIG. 1 is a diagram depicting an exemplary locking device programming and management environment, consistent with certain disclosed embodiments.

FIG. 1 is a diagram depicting an exemplary locking device programming and management environment, consistent with certain disclosed embodiments. It should be appreciated that the environment depicted in FIG. 1 is merely exemplary and various other combinations and types of components can be included.

Referring to FIG. 1, the environment can include a locking device management server 100 connected to a mobile device 110 via a network 120. Network 120 can be, for example, a telecommunications network or a global or wide area computer network. In some cases network 120 can be a local area network. In certain embodiments, network 120 can be a single communications network, while, in further embodiments, network 120 can represent of plurality of communications networks including computer networks and/or telecommunication networks.

Locking device management sever 100 can represent any type of computing device capable of managing locking device access information and communicating with mobile device 110 via network 120. In embodiments, locking device management server 100 can represent a single computing device, while, in further embodiments, locking device management server 100 can represent a plurality of computing devices interconnected via one or more communication networks.

In embodiments, locking device management server 100 can include a processor 102 communicating with a memory 104, such as electronic random access memory, or other forms of transitory or non-transitory computer readable storage mediums. Memory 104 can include a locking device information database 105. Locking device information database 105 can be utilized to store locking device status information, locking device identifier information, mobile device identifier information, digital certificate information, etc. In some implementations, mobile device identifier information can include mobile device numbers, international mobile subscriber identity (IMSI) information, subscriber identity module (SIM) information, etc.

Processor 102 can execute control logic and perform data processing to perform the functions and techniques as discussed herein. For example, processor 102 can process locking device programming triggers and retrieve and set locking device status and identifier information in locking device information database 105. Further, in embodiments, processor 102 can generate reports based on locking device status information stored in locking device information database 105.

Processor 102 can be connected to, provide commands to, and receive information from communication module 106. Locking device management server 100 can utilize communication module 106 to communicate with mobile device 110 via network 120. For example, communication module 106 can include a server-side network protocol application.

In embodiments, processor 102 can be configured to identify one or more locking device programming triggers. A locking device programming trigger can include a change in ownership of one or more locking devices. An administrator accessing locking device management server 100 can add, remove, and transfer ownership of one or more locking devices, causing a locking device programming trigger. In certain embodiments, ownership of a set of locks can be tied to ownership of a building containing the set of locks. Upon a change of ownership of the building, ownership of the locking devices can likewise be changed, which may necessitate reprogramming the device with a new owner identifier, encryption keys, or other locking device settings that pertain specially to the owner.

Additionally, a locking device programming trigger can include changing a list of approved users for one or more locking devices and/or changing levels of access of one or more users. An administrator can add users to or remove users from a list of approved users for a single locking device or for a set of locking devices. Additionally, different users may be granted different levels of access to specified locking devices, and such levels of access can be edited by an administrator. For example, a first user can be identified as an administrative user and be granted access to a set of locking devices in a building at all times, while a second user can be identified as a restricted user and only be granted access to a set of locking devices for a specified period of time.

Further, a locking device programming trigger can include changes to lock parameters. For example, an administrator can set the time zone of a lock, change the mode of operation of a locking device, such as change the mode of operation to latch open or auto-relock, set the duration of time to hold the locking device open, set configuration instructions for a locking device to remain open during specified periods of time, or set specified periods of time for restricted users. Any changes to the lock parameters of one or more locks can cause a locking device programming trigger.

Once a locking device programming trigger is recognized, processor 102 can select, automatically or as directed by an administrator, one or more mobile devices, including mobile device 110, to transfer programming instructions. For example, processor 102 can identify that mobile device 110 is associated with a locking device user classified as an installer for a desired locking device or processor 102 can identify that mobile device 110 has permission to access the desired locking device. Accordingly, processor 102 can transfer programming instructions to mobile device 110 using communication module 106.

In some embodiments, transferring or sending locking device programming instructions to mobile device 110 may be done by mobile device 110 first initiating communication with locking device management server 100 to request or pull queued locking device programming instructions.

In some embodiments, processor 102 can additionally send one or more digital certificates to mobile device 110. The one or more digital certificates can be utilized by mobile device 110 to transfer to the locking device and verify that mobile device 110 has been approved to transfer programming instructions. The digital certificates and locking device programming instructions can include data that can be processed by a processor 102. The data may include a locking device 130 unique identifier or a locking device 130 owner unique identifier, either of which may be used to identify the specific lock or set of locks for which the locking device programming instructions are targeted. The data may further include a programming identifier that is unique to the programming transaction to provide traceability throughout the programming process. The data may include an expiration date when the locking device programming instruction is set to expire or to identify newer instructions that supersede older instructions. Further, the data may include actual programming instructions, such as address, length, value objects that specify how to change the memory contents of the locking device 130. Or, the data may include a special command that, when executed by the locking device 130, effects a programming operation. The data may be encrypted and may include a digital signature that ensures the integrity of the locking device programming instruction in a way that the locking device 130 can verify.

In embodiments, communication module 106 can utilize cryptographic protocols to prevent unauthorized access to locking device management server 100 and to ensure that mobile device 110 is authorized to receive locking device programming instructions. Additionally, in embodiments, communications and information exchanged between locking device management server 100 and mobile device 110 can be encrypted and decrypted using one or more encryption methods.

Mobile device 110 represents any type of mobile computing device capable of communicating with locking device management server 100 via network 120 and, additionally, capable of communicating with a locking device 130. Although mobile device 110 is depicted in FIG. 1 as a single device, in some embodiments, mobile device 110 can represent a plurality of mobile devices capable of communicating with locking device management server 100 and locking device 130.

In embodiments, mobile device 110 can communicate with locking device 130 via a signal 115. Signal 115 can represent various forms of wireless signals including, but not limited to, Bluetooth®, infrared, Near Field Communication (NFC), Wi-Fi, Zigbee®, and other radio signals. Accordingly, mobile device 110 can communicate with locking device 130 when mobile device 110 and locking device 130 are a distance to communicate by Bluetooth®, infrared, NFC, Wi-Fi, Zigbee®, or other radio signals. Additionally, in embodiments, information communicated between mobile device 110 and locking device 130 can be encrypted and decrypted using one or more encryption methods, such as Triple Data Encryption Standard (3DES), Advanced Encryption Standard (AES), RSA, Elliptic curve cryptography (ECC), etc.

Locking device 130 represents any type of device capable of fastening and/or controlling access, and locking device 130 can include mechanical and electrical components. Additionally, locking device 130 can receive signals from and transfer signals to mobile device 110. Although locking device 130 is depicted in FIG. 1 as a single device, in some embodiments, locking device 130 can include a plurality of interconnected devices capable of performing the functions discussed herein. Additionally, in further embodiments, locking device 130 can represent a plurality of locking devices capable of receiving signals from and transferring signals to mobile device 110.

In some embodiments, locking device 130 can be configured to request and/or verify digital certificate information from mobile device 110. Additionally, in certain implementations, locking device 130 can be configured to decrypt information received from mobile device 110 and encrypt information sent to mobile device 110.

It should be appreciated that the environment depicted in FIG. 1 is merely exemplary and can include various combinations and types of components.

Figure 2:
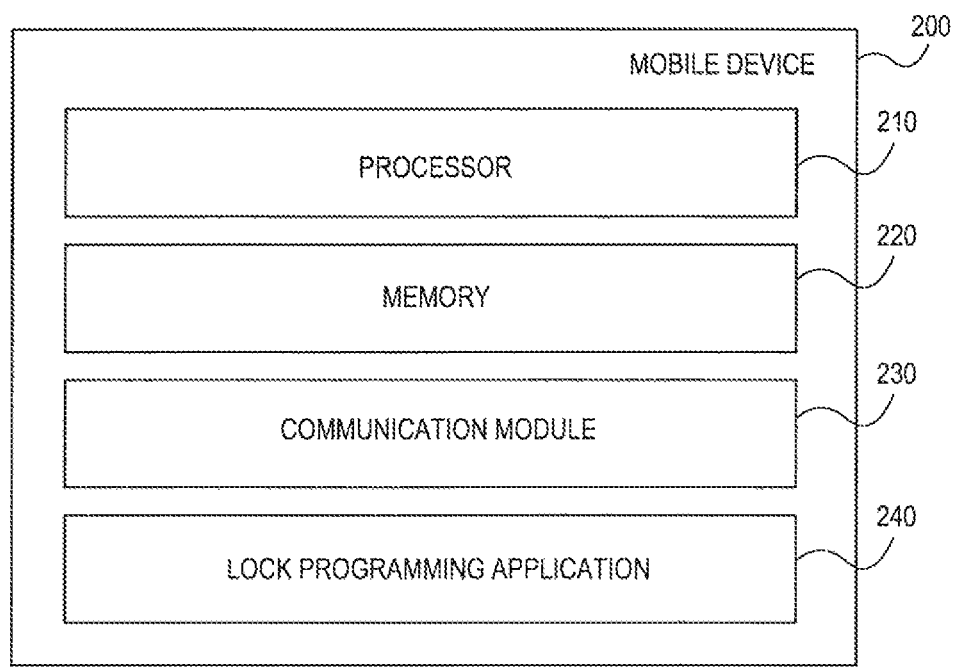
FIG. 2 is a diagram depicting an exemplary mobile device, consistent with certain disclosed embodiments.

Referring to FIG. 2, depicted is a mobile device 200, and components thereof. It should be appreciated that FIG. 2 represents a generalized schematic illustration and that other components and/or entities can be added or existing components and/or entities can be removed or modified.

As shown in FIG. 2, mobile device 200 can include a processor 210 communicating with a memory 220, such as electronic random access memory, or other forms of transitory or non-transitory computer readable storage mediums. Processor 210 can further communicate with communication module 230, which in turn can communicate with a wide area network, such as various public or private networks, telecommunications networks, and/or via wireless signals. More particularly, the wide area network can connect mobile device 200 to one or more locking device management servers, such as locking device management server 100, as discussed with respect to FIG. 1, and/or other components. Additionally, mobile device 200 can communicate with one or more locking devices, such as locking device 130, as discussed with respect to FIG. 1, via wireless signals, such as an infrared or Bluetooth® signal.

Processor 210 can execute control logic and perform data processing to perform functions and techniques as discussed herein. For example, processor 210 can install and/or execute a locking device programming application 240. In some embodiments, locking device programming application 240 may be a part of a general access control application for opening locking devices. Further, locking device programming application 240 can be configured to receive locking device programming instructions for one or more locking devices from a locking device management server. Additionally, in embodiments, locking device programming application 240 can be configured to store, using memory 220, locking device identifier information and/or digital certificate information for communicating with the one or more locking devices.

In embodiments, upon receipt of locking device programming instructions, locking device programming application 240 can utilize communication module 230 to transmit a wireless signal to search for specified locking devices. In some embodiments, locking device programming application 240 can search for the specified locking devices automatically, while, in further embodiments, locking device programming application 240 can require instructions from a user of mobile device 200 before such wireless signals are transmitted.

Automatic searching can be performed based on known GPS locations of locking devices, where the locking device programming application initiates communication on arriving at a pre-determined location. Further, automatic search can be a periodic search that happens continuously until a lock responds. Additionally, a user instruction for initiating a search for specified locking devices could be the same operation that a user would initiate normally to open a locking device, such as an open command to locking device programming application 240. In some implementations, the programming operation could happen automatically during the normal locking device open sequence without the user's knowledge, while, in further embodiments, the programming operation could occur without any instructions from the user.

Once locking device programming application 240 receives a confirmation signal back from a specified locking device, locking device programming application 240 can transmit locking device programming instructions and/or digital certificates to the locking device. In some embodiments, locking device programming application can transmit, using communication module 230, the locking device programming instructions and/or digital certificates to the locking device automatically, while, in further embodiments, locking device programming application 240 can require instructions from a user of mobile device 200 before any information is transmitted.

In certain implementations, locking device programming application 240 can be configured to receive multiple sets of programming instructions for various different locking devices. Additionally, locking device programming application 240 can be configured to discard expired programming instructions and/or non-current programming instructions. For example, programming instructions can be specified to be transferred within a certain time window, for example, one week. If the programming instructions are not transferred to the specified locking device by the end of the time window, the programming instructions can be discarded. Further, as an additional example, locking device programming application 240 can discard locking device programming instructions for a specified locking device upon receipt of more recent locking device programming instructions for the same locking device.

In some embodiments, once locking device programming application 240 transmits locking device programming instructions to and receives a confirmation status from a specified locking device, locking device programming application 240 can transfer a confirmation status back to a locking device management server.

Figure 3:
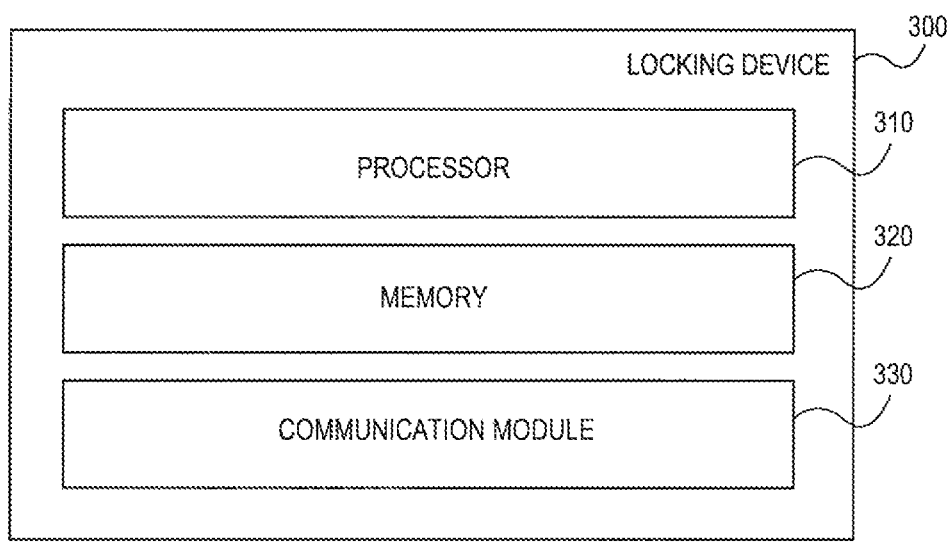
FIG. 3 is a diagram depicting an exemplary locking device, consistent with certain disclosed embodiments.

Referring to FIG. 3, depicted is a locking device 300, and components thereof. It should be appreciated that FIG. 3 represents a generalized schematic illustration and that other components and/or entities can be added or existing components and/or entities can be removed or modified.

As shown in FIG. 3, locking device 300 can include a processor 310 communicating with a memory 320, such as electronic random access memory, or other forms of transitory or non-transitory computer readable storage mediums. Processor 310 can further communicate with communication module 330, which in turn can communicate with mobile devices via wireless signals.

Processor 310 can execute control logic and perform data processing to perform the functions and techniques as discussed herein. For example, processor 310 can be configured to verify digital certificates, for example, digital certificates that were generated by the locking device management server, from mobile devices received via wireless signal using communication module 330, execute locking device programming instructions, and transmit status information back to the mobile devices via wireless signal.

In some embodiments, locking device 300 can be configured to constantly search for incoming wireless signals from mobile devices, while, in additional embodiments, locking device 300 can be configured to search for incoming wireless signals during specified periods of time.

In still further embodiments, locking device 300 can include an input that allows a user to "wake up" or activate locking device 300. After locking device 300 receives the "wake up" input, locking device 300 can begin searching for an incoming wireless signal from a mobile device. For example, locking device 300 can include a "wake up" button, or, as additional examples, locking device 300 can receive a "wake up" input by a user turning a handle attached to locking device 300, or can sense the presence of a user nearby with a presence sensor such as passive infrared sensor.

Figure 4:
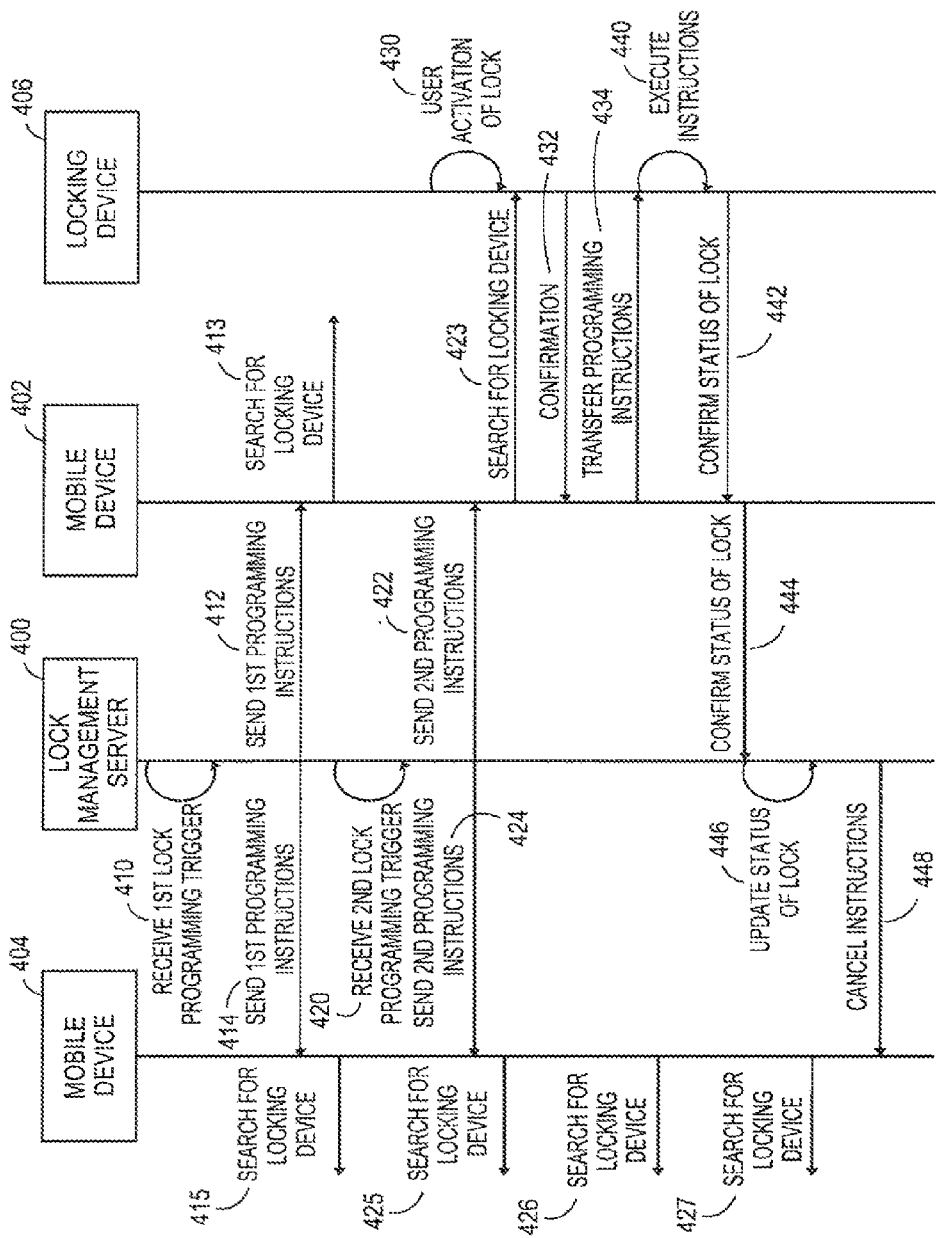
FIG. 4 is a flow diagram depicting an exemplary sequence of locking device programming and management communications, consistent with certain disclosed embodiments.

Referring to FIG. 4, depicted is a sequence detailing embodiments as described herein. More particularly, the sequence details communications and interactions among a locking device management server 400, mobile devices 402 and 404, and a locking device 406. Locking device management server 400 can represent a computing device capable of communicating with mobile devices, similar to locking device management server 100 depicted in FIG. 1. Mobile devices 402 and 404 can represent mobile devices capable of communicating with a locking device management server and a locking device, similar to mobile device 110 depicted in FIG. 1. Locking device 406 can represent a device capable of locking and/or controlling access and capable of communicating with mobile devices, similar to locking device 130 depicted in FIG. 1. It should be appreciated that the sequence of FIG. 4 is merely exemplary and can comprise more or fewer functionalities.

Processing can begin when locking device management server 400 receives a first locking device programming trigger (410). Locking device management server 400 can send a first set of programming instructions for locking device 406 based on the first locking device programming trigger to mobile device 402 (412) and mobile device 404 (414). Upon receipt of the first locking device programming instructions, mobile devices 402 and 404 can begin searching for locking device 406 via wireless signals (413 and 415).

Additionally, locking device management server 400 can receive a second locking device programming trigger (420). Locking device management server 400 can send a second set of programming instructions for locking device 406 based on the second locking device programming trigger to mobile device 402 (422) and mobile device 404 (424). Upon receipt of the second locking device programming instructions, mobile devices 402 and 404 can discard the first locking device programming instructions and can continue searching for locking device 406 via wireless signals (423 and 425-427).

Further, a user, such as the user of mobile device 402, can "wake up" or activate locking device 406 (430). Accordingly, locking device 406 can receive the searching signal from mobile device 402 and send a confirmation signal back to mobile device 402 (432). Upon receipt of the confirmation signal, mobile device 402 can transmit the second locking device programming instructions to locking device 406 (434).

Upon receipt of the second locking device programming instructions, locking device 406 can execute the instructions, effectively reprogramming locking device 406 (440). Locking device 406 can then send a confirmation of the current status of locking device 406 back to mobile device 402 (442). Upon receipt of the confirmation of the current status of locking device 406, mobile device 402 can send a confirmation of the current status of locking device 406 to locking device management server 400 (444).

Upon receipt of the confirmation of the current status of locking device 406, locking device management server 400 can update the current status of locking device 406 in a locking device management database (446). Locking device management server 400 can then transfer a cancel transmission of programming instructions to mobile device 404 (448), upon receipt of which mobile device 404 can cease searching for locking device 406. In other cases, mobile device 404 may request an update and receive a new locking device programming instruction list that no longer contains the completed programming operations. Further, a mobile device 404 may attempt to program a locking device after completion of the above sequence or a similar sequence, and the locking device may reject expired or out-of-date programming instructions or programming instructions that have been superseded by more recent programming instructions.

It has been shown how the present embodiments have been attained. Modification and equivalents of the disclosed concepts are intended to be included within the scope of the claims, which are appended hereto.

What is claimed is:

1. A system for managing content information comprising:
   a server configured to communicate with one or more mobile devices;
   a processing system comprising one or more processors;
   a database of locking device status information; and
   a memory system comprising one or more computer-readable media, wherein the computer-readable media contain instructions that, when executed by the processing system, cause the processing system to perform operations comprising:
     identifying a locking device programming trigger; and
     transmitting locking device programming instructions for one or more locking devices to one or more mobile devices based on the locking device programming trigger, wherein the one or more mobile devices are configured to transmit the locking device programming instructions to the one or more locking devices via a wireless signal, automatically, when a mobile device and a locking device are a distance to communicate by one of Bluetooth®, infrared, NFC, Wi-Fi, Zigbee®, and radio signals;
     receiving a locking device status information from the one or more mobile devices;
     updating the database of locking device status information based on the locking device status information; and,
     transferring locking device programming cancellation instructions to the one or more mobile devices based on the locking device status information to stop the one or more mobile devices from searching for the one or more locking devices.

2. The system of claim 1, further comprising the one or more locking devices, wherein the one or more locking devices are capable of communicating with the one or more mobile devices, each of the one or more locking devices comprising:
   one or more locking components;
   a wireless receiver capable of receiving wireless signals from the one or more mobile devices;

a locking device processing system, comprising one or more locking device processors, connected to the wireless receiver and capable of controlling the one or more locking components; and a locking device memory system comprising one or more locking device computer-readable media, wherein the locking device computer-readable media contain instructions that, when executed by the locking device processing system, cause the locking device processing system to perform locking device operations comprising:

receiving locking device programming instructions from the one or more mobile devices via a wireless signal, wherein the locking device programming instructions are transferred from the one or more mobile devices to a respective one of the one or more locking devices, automatically, when the one or more mobile devices and the respective one of the one or more locking devices are a distance to communicate by one of Bluetooth®, infrared, NFC, Wi-Fi, Zigbee®, and radio signals; and executing the locking device programming instructions, wherein the locking device programming instructions relate to controlling the one or more locking components.

3. The system of claim 2, wherein each of the one or more locking devices further comprise a wireless transmitter capable of transmitting wireless signals to the one or more mobile devices, wherein the locking device operations further comprise transferring lock status information to the one or more mobile devices based on executing the locking device programming instructions.

4. The system of claim 2, the locking device operations further comprise activating the wireless receiver, based on a user activation input, from an inactive state incapable of receiving an incoming wireless signal from the one or more mobile devices to an active state capable of receiving an incoming wireless signal from the one or more mobile devices.

5. The system of claim 2, wherein the locking device operations further comprise: receiving digital certificate information from the one or more mobile devices; and validating the digital certificate information from the one or more mobile devices.

6. The system of claim 1, the operations further comprise generating a report of locking device status information based on the database of locking device status information.

7. The system of claim 1, wherein transmitting locking device programming instructions to the one or more mobile devices occurs subsequent the one or more mobile devices initiating an opening operation of the one or more locking devices.

* * * * *